United States Patent
Harley, Jr.

(10) Patent No.: US 7,356,046 B2
(45) Date of Patent: Apr. 8, 2008

(54) METHOD AND APPARATUS FOR REMOTELY MONITORING AND CONTROLLING DEVICES

(75) Inventor: Joseph L. Harley, Jr., Melbourne, FL (US)

(73) Assignee: Metretek, Inc., Melbourne, FL (US)

( * ) Notice: Subject to any disclaimer, the term of this patent is extended or adjusted under 35 U.S.C. 154(b) by 830 days.

(21) Appl. No.: 10/774,570

(22) Filed: Feb. 9, 2004

(65) Prior Publication Data

US 2005/0175031 A1   Aug. 11, 2005

(51) Int. Cl.
*H04J 3/16* (2006.01)
(52) U.S. Cl. ...................... 370/466; 370/352
(58) Field of Classification Search ............. 370/463, 370/474, 464–466, 352–354; 375/222; 709/203, 709/217–219
See application file for complete search history.

(56) References Cited

U.S. PATENT DOCUMENTS

| | | | |
|---|---|---|---|
| 4,241,237 A | 12/1980 | Paraskevakos et al. | 379/106.06 |
| 4,455,453 A | 6/1984 | Paraskevakos et al. | 379/106.06 |
| 5,007,050 A * | 4/1991 | Kasparian et al. | 370/280 |
| 5,675,584 A * | 10/1997 | Jeong | 370/284 |
| 5,754,553 A * | 5/1998 | Shimoda | 370/471 |
| 5,796,742 A * | 8/1998 | Klotzbach et al. | 370/466 |
| 5,961,626 A * | 10/1999 | Harrison et al. | 710/305 |
| 6,034,963 A * | 3/2000 | Minami et al. | 370/401 |
| 6,108,300 A * | 8/2000 | Coile et al. | 370/217 |
| 6,160,819 A * | 12/2000 | Partridge et al. | 370/474 |
| 6,393,483 B1 * | 5/2002 | Latif et al. | 709/226 |
| 2002/0090001 A1 * | 7/2002 | Beckwith | 370/466 |

\* cited by examiner

*Primary Examiner*—Ricky Q. Ngo
*Assistant Examiner*—Pao Sinkantarakorn
(74) *Attorney, Agent, or Firm*—James R. Eley; Michael A. Forhan; Eley Law Firm Co.

(57) ABSTRACT

A system for remotely monitoring and controlling devices. A software-based protocol converter converts asynchronous serial control and data signals from a host application computer program to Internet Protocol ("IP") packet-switched signals. The converted signals are transmitted to a remote device, such as a meter or a valve, by means of a packet-switching network. The received IP packet-switching signals are converted by a hardware-based protocol converter into asynchronous serial control and data signals compatible with the remote device. The hardware-based protocol converter is also capable of converting asynchronous serial data feedback signals from the remote device to IP packet-switching signals and transmitting them to the host application computer program via the packet-switching network. The feedback signals are converted to asynchronous serial data signals compatible with the host application computer program by the software-based protocol converter.

28 Claims, 11 Drawing Sheets

84

112

METHOD AND APPARATUS FOR REMOTELY MONITORING AND CONTROLLING DEVICES

FIELD

The present invention relates generally to remote monitoring and control and, more particularly, to providing secure communications for monitoring and control of remote devices.

BACKGROUND

The collection, processing, and distribution facilities for many products, such as oil and gas, are typically spread over a wide geographical area with numerous remote locations. There is a need to regularly monitor and control these facilities for such purposes as product flow control, fault detection, and consumption measurement. One or more centralized stations are desirable to monitor and control the facilities, since many activities involved in the product collection, processing, and distribution process require coordination and cooperation between two or more facilities. This drives a need for the central station to receive data from a plurality of facilities for monitoring purposes and to transmit control commands, such as to open or close flow control valves. Remote monitoring and control ("RMC") systems are widely used in various areas such as security, energy market de-regulation, and traffic control.

Remote monitoring and control continues to grow in terms of capability and number of deployments. In addition, advancements in computer software and electronic technologies are making it increasingly feasible to implement remote monitoring and control in new applications.

Of particular interest are legacy RMC systems. The term "legacy" as used herein is intended to describe, without limitation, any existing installed RMC system or any contemporary version, configuration, combination or assembly of remote monitoring host application computer programs and remote devices that do not directly utilize packet-switching data or Internet Protocol networks. In most legacy RMC systems, communication sessions between a host computer or "master" at a central station, and a remote device or "slave" at a remote station are originated by the host computer. One skilled in the art will note that an analogy to modem client-server structured networks exists wherein the host computer is a client and the remote device is a server. A serious drawback to this approach becomes evident when the communication sessions are configured to take place using publicly accessible wired or wireless Internet Protocol ("IP") networks. This is because a potential security risk exists wherein remote monitoring and control signals may be routed through a number of servers, exposing the signals to interception and tampering.

Many RMC communications are serial and half-duplex in nature, wherein commands are issued by the master and responses are returned by the slave. Although some communication standards exist, the command-response structure or protocol, as well as the remote device data structure or "payload" delivered by the protocol, is typically non-standard and often proprietary to the vendor of the RMC system. This tends to create barriers to market entry by any party that would seek to augment or modify such proprietary systems.

Another drawback of legacy RMC systems is the wide area network ("WAN") typically used to connect the remote device and the host computer. A physical real-time switched circuit is typically dedicated to a data communication link that has been established between the host and the remote device. Although the physical circuit may be either wired or wireless, the dedicated nature of the circuit requires that remote monitoring system owners and/or operators pay for the circuit even when it is not in use. System expenses associated with dedicated communication links include physical facilities, maintenance and, in the case of wireless links, license fees.

The technological evolution of modem telephony is quickly replacing circuit-switched service with packet-switched or "store-and-forward" service, as exemplified by Internet Protocol. With packet-switching technology, physical circuits are shared by a plurality of users in time and/or frequency domains. These physical circuits may be based on either wired or wireless technology, but regardless of the physical nature of the circuit, a virtual circuit appears to be dedicated to each user desiring to send a packet of information. Packets, in turn, transport the protocol commands and responses that implement the remote monitoring and control application, as described above.

Because of the efficiency of packet switching, wireless IP network operators, whether private or public, offer their constituents significant price and performance advantages over the legacy dedicated switched-circuit environment. Among these advantages, higher data throughput and reduced pricing for a given amount of data transmitted are perhaps the most attractive to users. Consequently, remote monitoring system operators are motivated to move their applications to wireless IP networks. Unfortunately, the potential gains from migrating to wireless IP are often offset by the expense and technical difficulties associated with the migration. This is because the technical and operational interface to wireless IP networks is typically not compatible with legacy remote monitoring host application computer programs and remote devices. Typical consequences of the incompatibility are lost data packets and transmission latency introduced by the store-and-forward nature of packet switching. In addition, the protocols used by real-time circuit-switched facilities can cease to function when subjected to packet transmission errors and/or delay. This further drives a need to modify legacy remote monitoring systems for compatibility with packet-switched networks. This can be an expensive undertaking, making such conversions economically unfeasible.

What is needed is a cost-efficient and operationally transparent interface method and apparatus that will support data transport on wireless IP networks while offering a conversion process that eliminates the need to modify legacy remote monitoring host application computer programs or remote devices while at the same time providing a single server system which is practical to secure from intruders.

SUMMARY

The present invention accomplishes these and other objectives by using electronic hardware driven by embedded programming at the remote device location and a computer program at the host application computer location. This makes it possible to automatically make the conversion from Internet Protocol packet switching to the asynchronous serial data, dedicated-circuit environment utilized by many legacy remote monitoring systems.

The lack of strict protocol and payload standards for remote monitoring and control systems presents problems that must be addressed. However, one de-facto communication standard has been consistently deployed for many years, known in the art as the Hayes-compatible "AT"

command set for modems. This standard is widely deployed for computer-based data communications and supports the setup and tear down of communication sessions by remote monitoring host application computer programs and remote devices. The present invention takes advantage of the ubiquity and relative stability of the AT command set, and provides a means to overcome the above-described difficulties associated with coupling asynchronous serial data RMC systems to packet-switched data transmission systems.

In an example embodiment of the present invention, a legacy remotely-located, microcomputer-based electricity meter is connected to an associated host application computer program for the purposes of meter configuration, maintenance, and obtaining electricity consumption data. Communications between the host application and the remote meter are presently conducted via a real-time, circuit switched facility of some kind, such as a telephone connection. In the alternative, it is desired that the communications be handled via a packet switched, wireless IP network due to the advantages of such networks. Because neither the meter nor the associated software are capable of interfacing directly with the wireless IP network, modifications must be made to both.

The present invention allows legacy RMC systems to communicate via packet-switched networks without expensive modification to those systems. A hardware component of the present invention (HCPI), inclusive of a radio frequency transceiver, is electrically connected to an asynchronous serial data communication port of the remote meter. The HCPI is a hardware-based protocol converter, as will be discussed in more detail below. A software component of the present invention (SCPI) is a software-based protocol converter that is installed on the computer which is hosting the meter application computer program. The host computer is connected to the IP network using conventional means. The SCPI provides virtual asynchronous serial data communication or "COM" ports to the host application computer program. The SCPI COM ports are logically identical to those of conventional hardware COM ports normally associated with computer systems. The SCPI is responsive to and compatible with the AT modem command set used by the host application computer program to control analog modems in the legacy real-time, circuit switched environment. The SCPI accepts commands from the host application computer program to initiate and terminate communications sessions. During any given communication session, the SCPI dynamically converts into packet-switched IP, the real time asynchronous serial data sent by the host application computer program to the meter. Likewise, the SCPI makes the inverse conversion for asynchronous serial data sent by the meter to the host application computer program. These conversions do not alter either the application protocol or the data structures of the legacy systems. As a result, the present invention is transparent to the remote monitoring application, allowing legacy RMC systems to communicate via IP packet-switched communication networks without modification.

Similarly, at the remote meter site the HCPI provides a compatible serial data port connection to the meter. The HCPI converts data from an asynchronous serial, circuit-switched format to packet-switched IP, which complements the conversion process carried out at the host computer. The HCPI is programmed to initiate communication sessions with the host computer in response to a "page" signal from the SCPI. The SCPI issues the page utilizing a conventional e-mail or short message service ("SMS") methodology after receiving a "dial [number]" command from the host application computer program. In this way maximum communication security is maintained because the HCPI and associated remote device (the client) is limited to issuing connect requests to the host computer (the server) and is incapable of "listening on" or "serving" the IP network for connection requests, the source of which could be an unauthorized entity. This is contrary to most legacy RMC applications wherein the remote device functions as the server.

The HCPI is further programmed to initiate communication with the host computer by one of three means: (1) an interval schedule furnished to the HCPI by the SCPI; (2) standard AT-type dialing commands issued to the HCPI by the meter; and (3) electrical impulses from the meter to the HCPI, i.e., a triggering event such as event-driven origination.

The above described embodiment of the present invention can be applied equally to many other examples of remote monitoring and control systems which have been designed for a wide variety of different applications.

Transmission errors and delays, termed "latencies," are common in packet-switched networks and are likely to cause communications between components of legacy RMC systems to cease if not compensated for in some fashion. Any such compensation method thus must be transparent to the legacy RMC system in order to avoid disrupting the system or imposing a requirement to modify the system.

In this regard, the present invention introduces four novel methods of compensation for wireless packet switching networks. These methods may be used singularly or in any combination for optimal system performance. Implementation of these methods is termed generally herein as programmable connection tuning ("PCT") commands. Specifically, these methods include: (1) Fast Loop-Back; (2) Tickle Hold-Off; (3) Block Transmit; and (4) Dynamic Packet Sizing.

Fast Loop-Back can be implemented by the SCPI when non-critical responses must be issued to the remote monitoring host application computer program in a time frame that cannot be achieved by waiting for the remote device to respond via the packet switched network.

Tickle Hold-Off can be implemented by the SCPI to "satisfy" the response needs of the host application computer program during the period it waits for the desired response from the remote device.

Block Transmit can be implemented by the SCPI to obviate the impatience of the host application by impeding repeated commands and thereby enforcing the proper flow control of the command and response protocol which is native to the RMC.

Dynamic Packet Sizing can be implemented by both the SCPI and HCPI to reduce error driven retransmissions. In a fashion consistent with wireless communication networks in general, the quality of communication in wireless IP networks depends largely on the "forward path", i.e., the signal transmitted from a base station, and the receive sensitivity and selectivity of a mobile station, or HCPI in the present context. The relative height and gain of base station wireless antenna systems generally makes them far less susceptible to reverse path and multi-path fading interference as compared to a mobile station. The mobile station, due to its usual close proximity to the ground and many reflective surfaces, will routinely experience severe fading on the order of 10 dB or more. This limitation cannot be overcome simply by increasing transmitter power, as even the doubling of transmitter power represents only a 3 dB signal increase. The result of this fading is forward path errors. Thus, what appears to be a delay in any given response from the HCPI is actually repeated SCPI transmissions that are caused by these errors. Therefore, both the SCPI and HCPI base the packet sizing on response-delay timing variations, as well as on the received signal strength indication ("RSSI") reported by the transceiver sub-system contained within the HCPI.

The addition of PCT to the basic architecture and embodiment of the present invention provides all the tools necessary to realize the goal of transparent conversion to wireless packet switching.

One object of the present invention is to provide a system for remotely monitoring and controlling devices. A remote monitoring and control host application computer program is running on a computer. A second software-based computer program provides virtual communication ports with or without modem emulation protocol conversion and is logically coupled to an Internet Protocol packet-switching network. This computer program is also running on the computer in cooperation with the remote monitoring and control host application computer program. An IP packet-switching communication network is electrically coupled to the computer. A hardware modem is electrically coupled to a remote device. The hardware modem is electrically coupled to a wireless, packet-switching network. A programmable, software-based protocol converter is embedded within the hardware. The hardware modem also comprises an Internet protocol transceiver, a microprocessor and memory subsystem, an asynchronous serial data-to-parallel data interface, and a parallel data-to-asynchronous serial data interface. At least one asynchronous serial data signal initiated by the host application computer program is converted to Internet protocol by the software-based protocol converter program and is electrically communicated to the remote device via the second software program logical connection and the computer's electrical connection to the IP packet-switching communication network, hardware-based protocol converter, and hardware modem, the remote device being responsive to the command. Likewise, at least one asynchronous serial data signal initiated by the remote device is electrically coupled to the hardware modem and hardware-based protocol converter, converted to Internet protocol by the hardware-based protocol converter, electrically communicated by the wireless IP packet-switching communication network, electrically coupled to the computer, logically connected by the second software-based computer program, and converted to an asynchronous serial data signal by the second software-based protocol computer program, the host application computer program being responsive to the signal.

Another object of the present invention is an apparatus for facilitating communications between a processor at a legacy control station and a legacy remote device over a communication network. A set of instructions executable by the processor comprise instructions for communicating data from the control station to the remote device, comprising a first transmission portion adapted to accept signals from a preexisting host application computer program in a predetermined format, a second transmission portion adapted to convert the formatted host application computer program signals into a packet-switched format for transmission to the remote device by means of a network, and a third transmission portion adapted to generate commands to satisfy at least one host application computer program handshaking protocol. Also provided are instructions for receiving data from the remote device, comprising a first receiving portion adapted to accept packet-switched data from the network, a second receiving portion adapted to convert the packet-switched data into a predetermined format corresponding to the pre-existing communication protocol of the control station host application computer program, and a third receiving portion adapted to generate commands to satisfy at least one host application computer program handshaking protocol; and a hardware interface component located in proximity to the remote device, comprising a transceiver portion electrically coupled to the network and adapted to accept packet-switched signals from the network, and send packet-switched signals to the network. A remote processor is electrically coupled intermediate to the transceiver portion and the remote device, the remote processor being adapted to convert packet-switched signals received from the transceiver to a predetermined format corresponding to the communication protocol of the remote device, and convert formatted signals corresponding to the communication protocol of the data received from the remote device to packet-switched data. A bidirectional data interface electrically coupled to the remote device and the remote processor is used to communicate signals from the remote device to the remote processor and to communicate signals from the remote processor to the remote device, wherein the set of instructions and hardware interface component cooperate to facilitate communication between a legacy remote device and a corresponding legacy host application computer program by means of the communication network.

Yet another object of the present invention is a method for facilitating communications between a legacy control station and a legacy remote device over a communication network. Instructions executable by a processor are provided at the control station. A hardware interface component is provided in proximity to and in electrical communication with the remote device. Within the control station, communications from the control station to the remote device are facilitated by accepting signals from a preexisting host application computer program, converting the host application computer program signals from a predetermined format into a packet-switched format for transmission to the remote device by means of the communication network, generating handshaking commands to satisfy at least one host application computer program handshaking protocol, and communicating the handshaking commands to the host application computer program. Within the control station, communications from the remote device to the control station are facilitated by accepting packet-switched data from the network, converting the packet-switched data to a predetermined format corresponding to the communication protocol of the host application computer program, and generating handshaking commands to satisfy at least one host application computer program handshaking protocol, and communicating the handshaking commands to the host application computer program. Communications from the control station to the remote device are facilitated within the hardware interface component by accepting packet-switched signals from the network, converting the packet-switched data to a predetermined format corresponding to the communication protocol of the remote device, and communicating the converted data to the remote device. Communications from the remote device to the control station are facilitated within the hardware interface component by accepting signals from the remote device, the signals having a predetermined format corresponding to the communication protocol of the remote device, converting the signals to packet-switched data, and communicating the packet-switched data to the control station by means of the communication network, wherein the legacy control station and the legacy remote device communicate via the communication network.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like structural elements are identified with like numerals.

Figure 1:
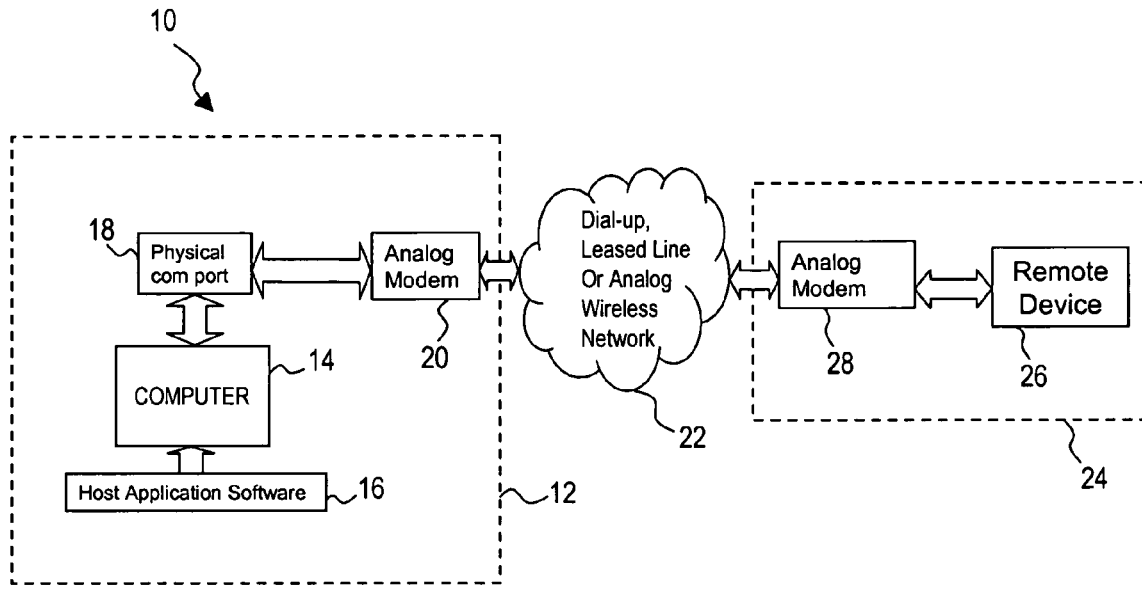
FIG. 1 depicts a simplified block diagram of a prior art remote device monitoring system architecture.

A block diagram of a typical RMC system 10 as found in the prior art is depicted in FIG. 1. A monitoring and control station 12 comprises a monitoring and control device such as a computer 14 having application software 16, an electrical communications port 18 and a first modem 20. Monitoring and control station 12 is connected to a legacy dedicated communications link 22, such as a dial-up telephone, leased telephone lines, and analog wireless telephone networks. A remote site 24 comprises a remote device 26, which is likewise linked to communications link 22 by means of a second modem 28. Remote device 26 may be any conventional measurement and/or control device, such as meters and electromechanical control valves.

In operation, control signals may be issued by monitoring and control station 12 to remote site 24. Station 12 uses computer 14 and software 16 to generate control signals. The control signals are transmitted to remote device 26 via communications port 18, first modem 20, communications link 22, and second modem 28. Remote device 26 receives the command signal issued by computer 14 via second modem 28 and responds in a predetermined manner in accordance with the command.

Likewise, metering and feedback signals may be initiated by remote site 24 and sent from the remote site to station 12. Remote device 26 generates a metering, telemetry or feedback signal and transmits it to computer 14 via second modem 28, communications link 22, first modem 20 and communications port 18. Systems similarly structured are utilized in a variety of applications including, without limitation, energy distribution, public utilities, traffic control, and irrigation control. Sometimes referred to as supervisory control and data acquisition systems ("SCADA"), they monitor and/or control remote devices and typically create a data store on a host computer system.

Figure 2:
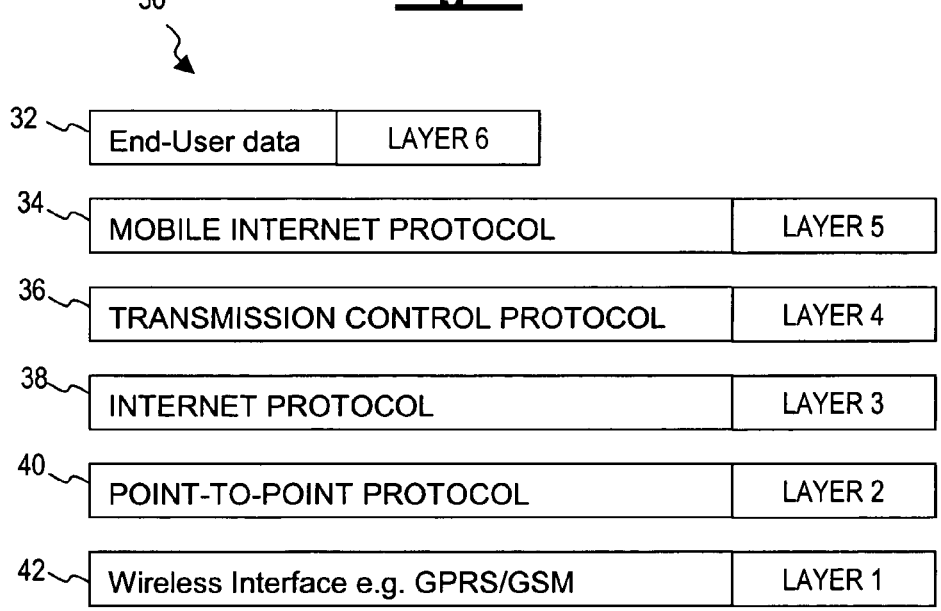
FIG. 2 illustrates a block diagram of a wireless IP protocol stack definition according to an embodiment of the present invention.

Referring now to FIG. 2, the present invention implements a six Layer version of a conventional protocol known in the art as the "Open Systems Interconnection data communication protocol model" 30 as developed by the International Standards Organization, often referred to as the "ISO/OSI", model. Remote device application data 32 is supported by five Layers: 34, 36, 38, 40, 42. Layer five, 34, is directed to an embodiment of the present invention and is analogous to the "session" Layer defined by the OSI model. Layers one through four, 36, 38, 40 and 42, are "public domain" types commonly used for wireless IP communications.

Figure 3A:
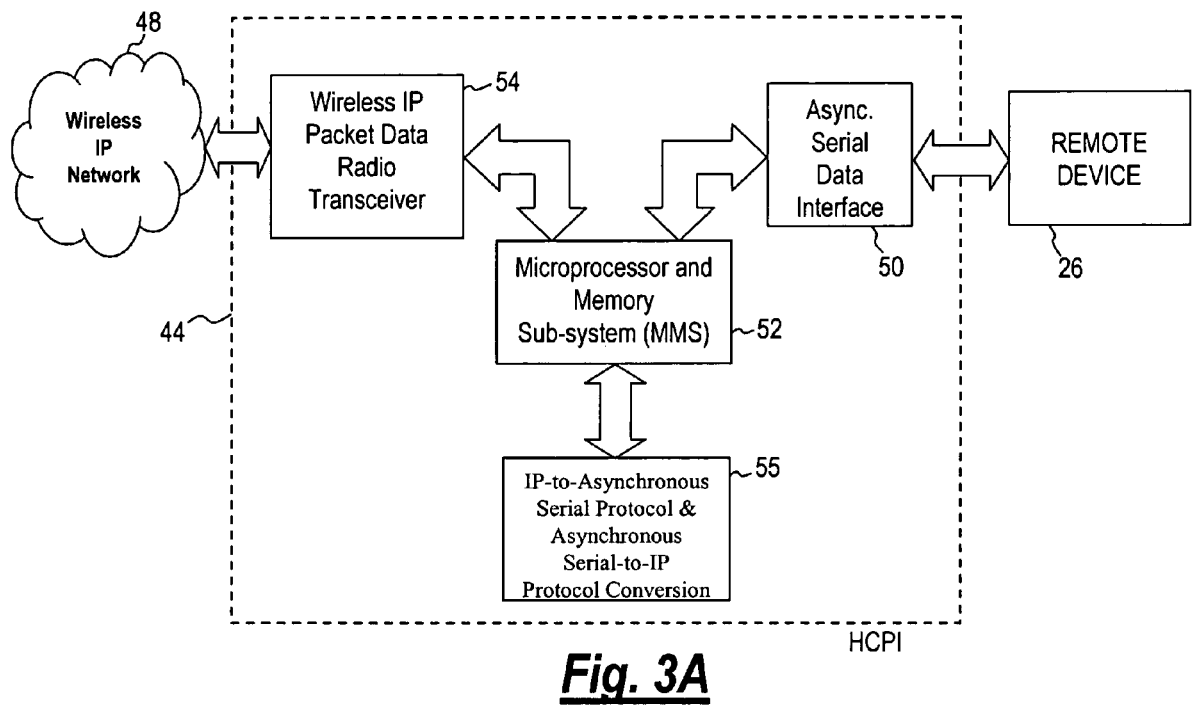
FIG. 3A is a block diagram of the hardware component of the present invention (HCPI) according to an embodiment of the present invention.
Figure 3B:
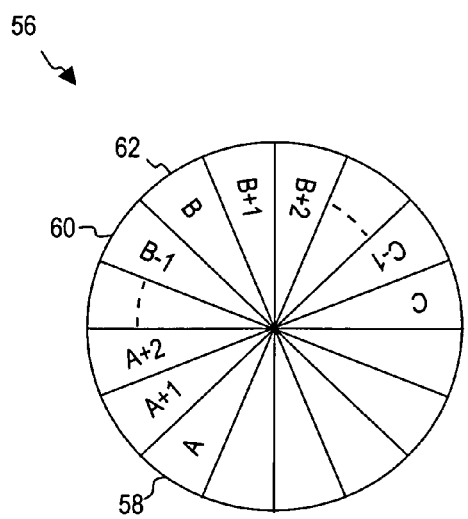
FIG. 3B is a logical illustration of a circular buffer according to an embodiment of the present invention.

In the context of the present invention, Layer five, 34, makes possible the autonomy and multiple control modes of a hardware-based protocol converter or HCPI (see FIGS. 3A and 3B). In turn, these modes provide for the system security and transparency to remote device data.

The HCPI acts only as a client on the IP communication network. As such, the HCPI will not "listen on" the network for connection requests and therefore is immune to electronic intrusion attempts. As a client, it must originate all communication sessions with the server, i.e., the software-based protocol converter or SCPI (see FIG. 4). As discussed above, several different functional states will result in the origination of a communication session by the HCPI. However, in all cases, connection requests to the server will not be honored unless the HCPI can successfully negotiate a secure connection or communication path, such as via conventional, predetermined and validated usernames and passwords. A conventional "digital signature" or "digital certificate" may also be utilized in connection with the secure connection. A digital signature is an electronic signature that can be used to authenticate the identity of the sender of a message or the signer of a document. It can also be used to ensure that the original content of the message or document sent has not been changed during subsequent transmissions. An example digital signature standard is the Digital Signature Standard ("DSS") established by the National Institute of Standards and Technology (NIST). A digital certificate functions as an electronic "passport" issued by a trusted third party that establishes a user's credentials when doing business or making transactions on electronic communication networks such as the Internet. An example digital certificate standard is the ITU-T X509 international standard established by the International Telecommunications Union (ITU). Layer five, 34, may also comprise any conventional form of data encryption means to further prevent interception and tampering. Example encryption means include, but are not limited to, encryption methods based on the Data Encryption Standard ("DES") promulgated by NIST and Netscape's Secure Sockets Layer ("SSL"). Use of encryption, such as 64-bit encryption, is a primary function of Layer five, 34, in the present invention. If encryption is employed, control and data signals originating from at least one of control station 12 and remote site 24 is encrypted before being transmitted via network 48. The encrypted control and data signals are subsequently decrypted after receipt by at least one of control station 12 and remote site 24.

A further function of Layer five is to support PCT. One of the four PCT methods, Dynamic Packet Sizing, requires a means for preventing distortion of remote device application data. In the present invention, this means is termed packet concatenation ("PCON"). PCON is an intelligent algorithm that is executed by and between the SCPI and the HCPI. It determines and identifies which remote device data have been separated from related data and that are required to be combined after transport across the wireless IP network.

Additional functions of Layer five, 34, include support of event detection and reporting by the HCPI, support of peripheral control output by the HCPI, and support of "over-the-air" or remote configuration of the HCPI by the SCPI.

Referring now to FIG. 3A, HCPI 44 is responsible for the direct electrical hardware interface component between remote device 26 and wireless IP network 48. Outbound data from and inbound data to remote device 26 flows through a number of hardware components, including a conventional asynchronous serial data interface 50. This interface provides a bidirectional data path to a remote processor such as a microprocessor and memory sub-system ("MMS") 52. The microprocessor and memory sub-system controls all aspects of data flow from remote device 26 and a conventional cellular packet data transceiver 54, via a conventional internal multi-threaded (time-sliced) programming methodology (not shown). In an embodiment of the present invention, a programmable, software-driven protocol converter 55 is embedded within HCPI 44 such that the instructions of the software are executable by the remote processor, MMS 52. In one embodiment of the present invention, protocol converter 55 is embedded within MMS 52.

With reference to FIGS. 3A and 3B in combination, MMS 52 comprises a segment of physical memory space termed a circular buffer 56, shown in FIG. 3B. Circular buffer 56 is dedicated to the temporary storage of data transmitted to and received from remote device 26. Inclusion of circular buffer 56 makes possible dynamic packet sizing for programmable connection tuning. Circular buffer 56 also makes it possible to use the present invention with remote devices that, by design, send data packets at rates higher than such packets typically can be transported over a wireless IP network. In operation, data from remote device 26 is read by microprocessor and memory system 52 via asynchronous serial data interface 50 and then stored in memory location A, within circular buffer 56. Subsequent data are in turn stored in locations A+1, A+2, etc. until the maximum determined IP packet size is reached. This final memory position will be denoted B-1, 60, and subsequently B, 62 will serve as the starting point for storage of the next data packet. Using a high clock speed and multi-threaded programming capability of microprocessor 52, data packet A, 58 in circular buffer 56 can be forwarded to wireless IP transceiver 54 for transmission even as data packet B, 62, is being stored in memory.

Figure 4:
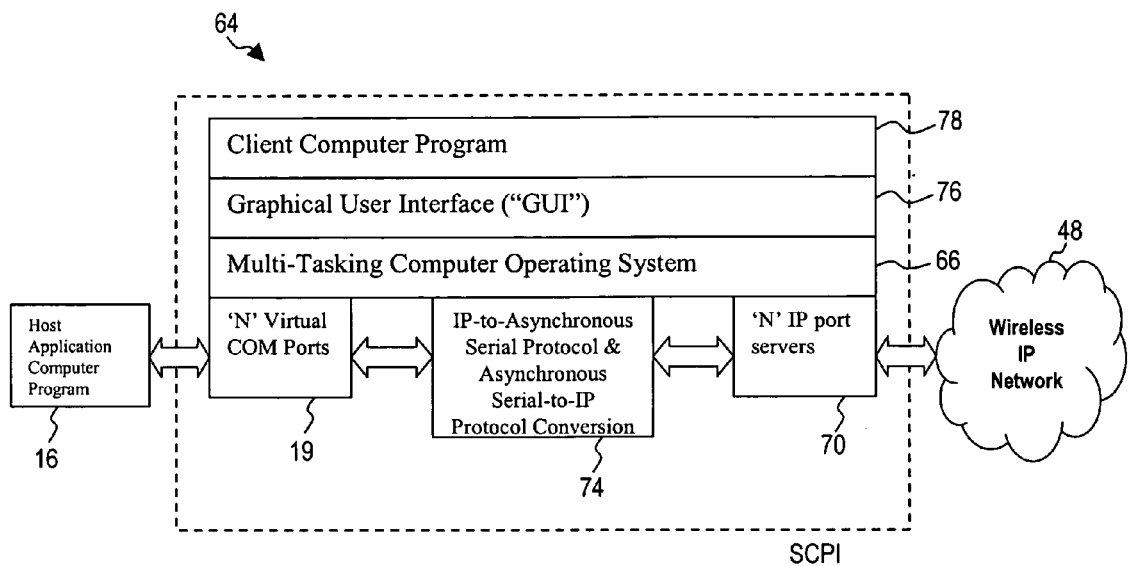
FIG. 4 is a block diagram of the software component of the present invention (SCPI) according to an embodiment of the present invention.

FIG. 4 details the architecture of the software component of the present invention (SCPI), identified generally as 64. SCPI 64 is a multi-threaded (time-sliced) application program, taking advantage of a multi-tasking computer operating system 66, enabling management of multiple tasks nearly simultaneously. Data flows bi-directionally between IP network 48 and host application computer program 16 via IP server ports 70, logical communications ports 19 and IP-Asynchronous Serial-IP protocol converter 74. This arrangement of hardware and software provides a means to achieve network transparency between host application computer program 16 and the remote legacy device 26. A graphical user interface ("GUI") 76 provides the means for initialization and configuration of all IP server ports 70, logical communications ports 19, a client computer program 78 such as an e-mail client program or a paging client program, and PCT functions as well as the remote programming of the HCPI.

Figure 5:
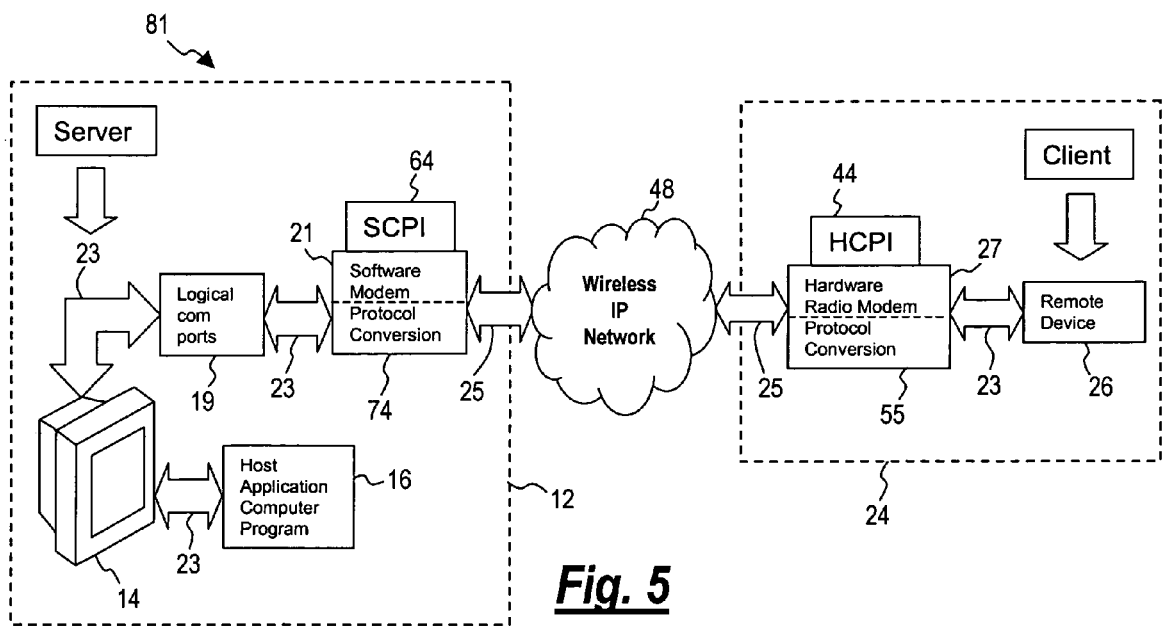
FIG. 5 is a block diagram of a remote monitoring and control system utilizing IP packet-switching communications according to an embodiment of the present invention.

A remote monitoring and control system 81 according to an embodiment of the invention is depicted in FIG. 5. A monitoring and control station 12 comprises a monitoring and control device, such as computer 14 having a host application computer program 16. At least one logical communications port 19 is provided. Logical communications port 19 is a computer program which provides virtual communication ports to electrically couple asynchronous control and data signals 23 to and from computer 14. Logical communications port 19 is electrically coupled to a SCPI 64, which acts to convert asynchronous control and data signals 23 from computer 14 to packet-switched IP protocol 25. SCPI 64 may also convert packet-switched signals 25 received from IP network 48 to asynchronous control and data signals 23. The converted asynchronous control and data signals 23 are electrically coupled to computer 14 by logical communications port 19. Thus, SCPI 64 may be considered bidirectional in operation. SCPI 64 is coupled to an IP network, such as wireless IP network 48, by means of a software modem 21. Software modem 21 is a computer program for modem emulation, electrically coupling SCPI 64 to IP network 48. Logical communication port 19 and software modem 21 may be made part of SCPI 64, or may be provided as separate components.

A remote site 24 comprises remote device 26, which is linked to wireless IP network 48 by means of a hardware modem 27. Remote device 26 may be one of many conventional measurement and/or control device, such as a meter or electromechanical control valve. An HCPI 44 interposed between hardware modem 27 and wireless IP network 48 acts to convert packet-switched data 25 to an asynchronous serial data format 23 compatible with remote device 26. HCPI 44 may also convert asynchronous control and data signals from remote device 26 to packet-switched data signals 25. The converted packet-switched data signals 25 are electrically coupled to wireless IP network 48 by hardware modem 27. Thus, HCPI 44 may be considered bidirectional in operation. Hardware modem 27 may be made part of HCPI 44, or may be provided as a separate component.

With continued reference to FIG. 5, in operation, asynchronous control and data signals 23 may be issued by monitoring and control station 12 to remote site 24. Station 12 uses computer 14 and host application computer program 16 to generate the asynchronous control and data signals 23. Control and data signals 23 are electrically coupled to SCPI 64 by logical communication port 19. SCPI 64 converts asynchronous control and data signals 23 to packet-switched signals 25. Packet-switched signals 25 are then coupled to IP network 48 by software modem 21, for transmission to remote site 24. The packet-switched signals 25 are received at remote site 24 by hardware modem 27, which forwards the packet-switched signals to HCPI 44. HCPI 44 converts packet-switched signals 25 to asynchronous control and data signals 23 which are compatible with remote device 26. Remote device 26 receives asynchronous control and data signals 23 from HCPI 44 and responds in a predetermined manner, in accordance with the asynchronous control and data signals 23 issued by computer 14 at control station 12.

With further reference to FIG. 5, metering and feedback signals may also be sent from remote site 24 to monitoring and control station 12. Remote device 26 generates an asynchronous metering, telemetry or feedback signal 23. Asynchronous signal 23 is converted to a packet-switched signal 25 by HCPI 44. Packet-switched signal 25 is coupled to IP network 48 by hardware modem 27. Packet-switched signal 25 is received from IP network 48 by software modem 21 and is forwarded to SCPI 64. SCPI 64 converts packet-switched signal 25 to asynchronous control and data signals 23. The asynchronous control and data signals 23 are then electrically coupled to computer 14 via logical communication port 19, where the asynchronous control and data signals are read and interpreted by host application computer program 16, in a predetermined manner.

FIGS. 6 through 13 exemplify an embodiment of the software component of the present invention.

Figure 6:
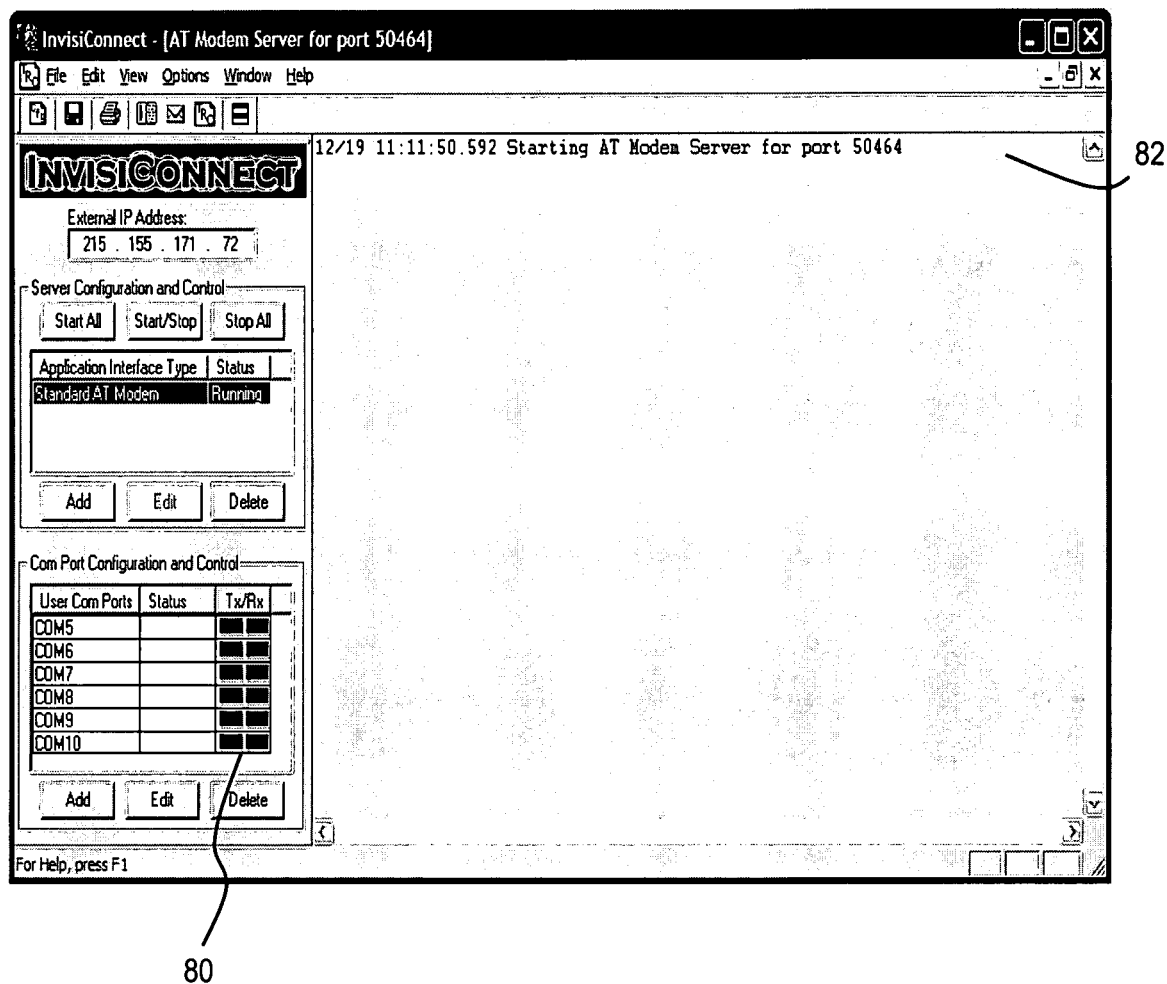
FIG. 6 is a screen display of the SCPI basic user interface for the port, data transfer and trace message monitoring according to an embodiment of the present invention.

Turning first to FIG. 6, there is illustrated a GUI 76 according to an embodiment of the present invention. In addition to providing the switches for access to all GUI 76 screen interfaces, dynamic activity of SCPI 64 is monitored and displayed by the GUI. Software-generated "transmit" data and "receive" data indicators 80 provide visual feedback to the user of the data traffic moving across each COM port. Moreover, a "trace" messaging function 82 provides hexadecimal representation of all data passing over each COM port, as well as text descriptions of the state of each connection. This trace messaging function provides the source information means for the user to structure and implement the novel PCT methods as required for the optimized connectivity of any given application.

Figure 7:
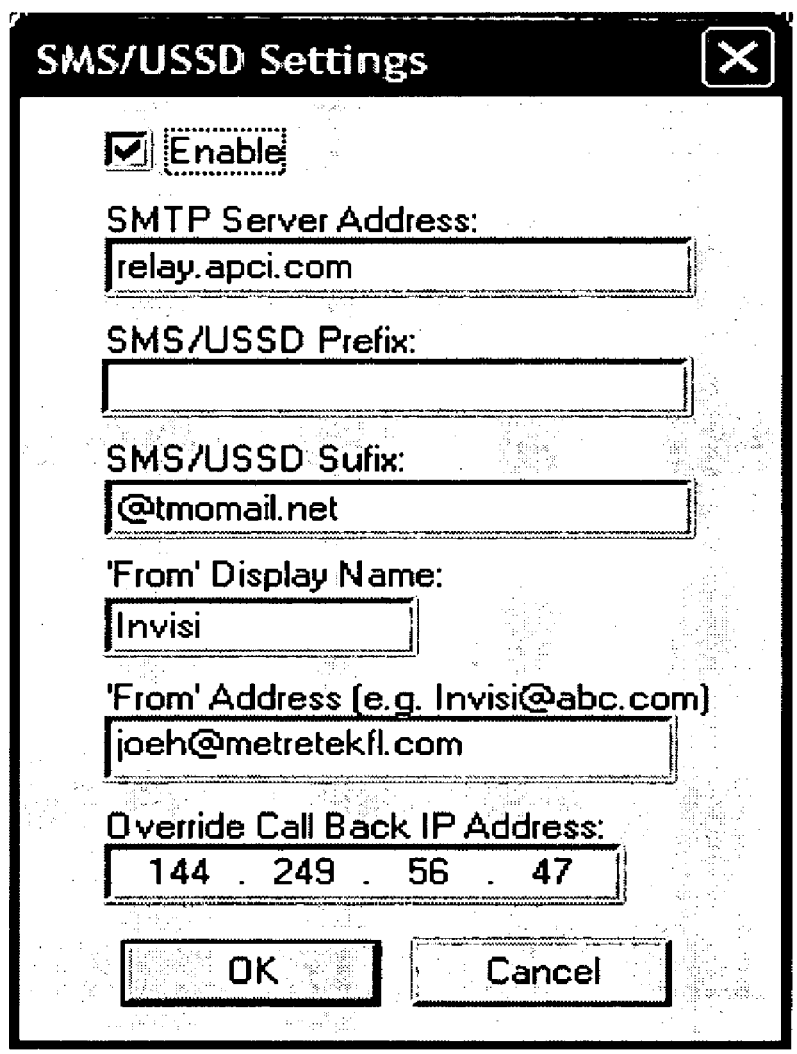
FIG. 7 is a screen display of the SCPI user interface for email client configuration according to an embodiment of the present invention.

Referring to FIGS. 3A, 4, 5 and 7 in combination with the example of a remote electrical meter discussed above, HCPI 44 is paged by an e-mail message sent from SCPI 64. This action will cause HCPI 44 to connect to a server (not shown) within IP network 48 for the purpose of on-demand access to remote device 26. To implement this function, SCPI 64 includes a conventional software e-mail client program 78 which requires access to a conventional standard simple mail transfer protocol ("SMTP") server (not shown). When connecting to such an e-mail serving facility, certain configuration parameters are required to be provided by e-mail client 78, such as the name or IP address of the SMTP server to be used for e-mail relay. An e-mail settings menu 84, such as depicted in FIG. 7, provides the user with the means to establish proper e-mail configuration.

Figure 8:
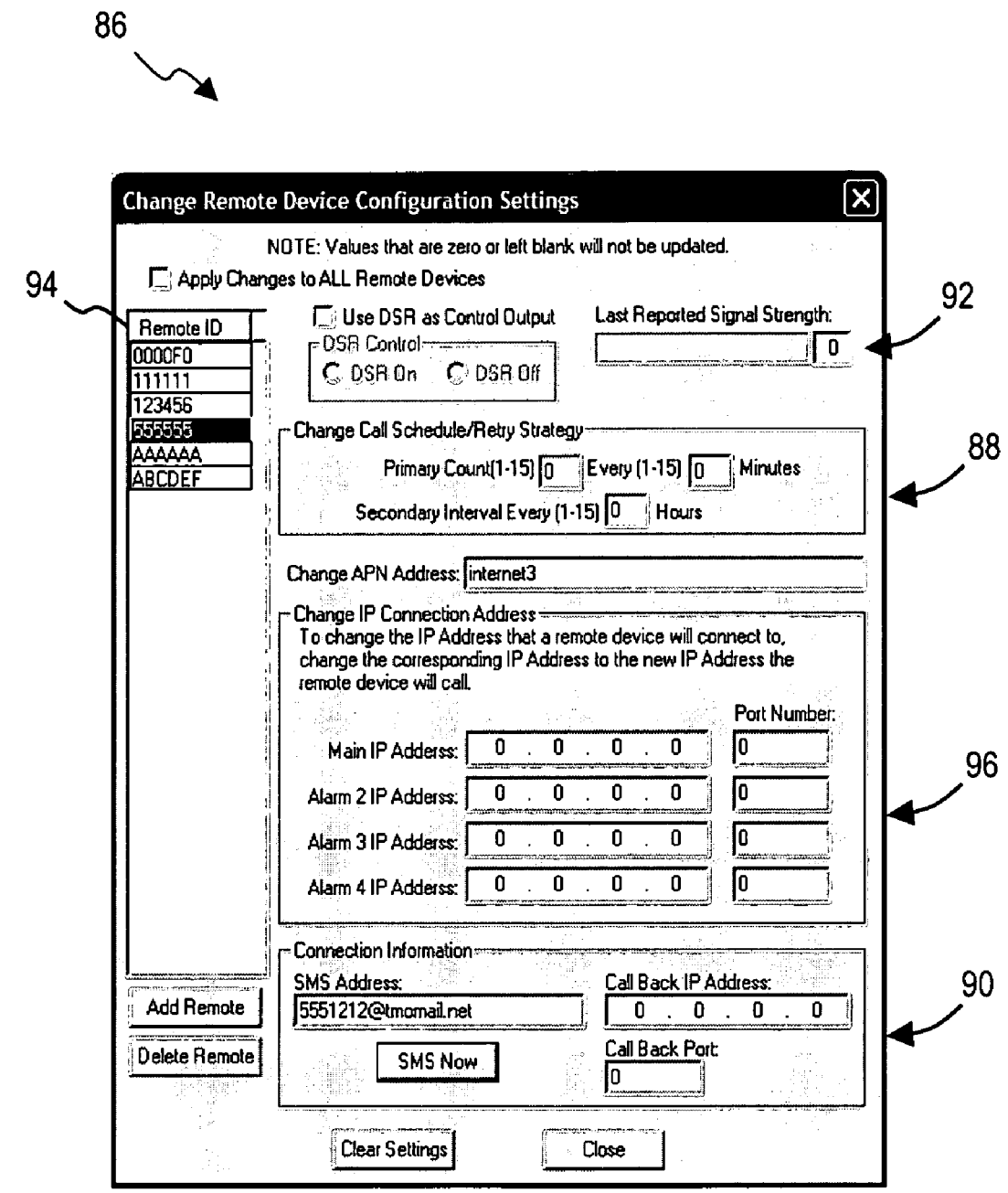
FIG. 8 is a screen display of the SCPI user interface for the HCPI configuration and programming according to an embodiment of the present invention.

FIG. 8 details a "change remote device configuration settings" menu 86. HCPI 44 may be remotely programmed or re-configured over the wireless IP network. In addition to network transparency, the present invention is also cost-effective. Remote programming is employed by the present invention to achieve cost effectiveness. This is because in practical use, IP server addressing (similar to telephone number assignment) can frequently change for a variety of reasons, including the dynamic assignment of IP addresses via the DHCP protocol. Thus it is important to be able to remotely reprogram the destination server address in HCPI 44, in order to avoid a need to physically visit to the site where HCPI 44 is located. Elimination of such visits clearly decreases the long term cost of utilizing of the system.

Further reduction in operating cost is achieved by remote programming of the "change call schedule/retry strategy" fields 88 of menu 86, as shown in FIG. 8. When remote systems can be contacted on a schedule that varies in accordance with current business operations, it is not necessary to incur essentially continuous communication costs that support the "peak" needs of the remote monitoring and control system. The call schedule variables in FIG. 8 allow discretionary remote device communication interval changes within a range extending from about 1 minute to about 2.5 days or "on-demand" only.

As can be seen from the screen shot depicted by FIG. 8, there are a number of HCPI 44 parameters that can be remotely programmed by SCPI 64. One example is the ability to instruct HCPI 44 to connect to a different IP server on a "one-off" communication session basis. This provides access to the remote device for additional personnel not co-located with the back-office (primary) server (not shown). Examples of such personnel might be maintenance technicians that work principally from their respective homes, vehicles or other locations remote from the back office. This function is executed when the "connection information" 90 fields are filled in as appropriate and host application computer program 16 (not shown) "dials" the HCPI 44 or the "SMS Now" switch is actuated by mouse click or keyboard entry. Note that if values of zero are entered into the "call-back" IP address and port number that HCPI 44 is programmed to ignore these values and connect to the primary IP server it has been previously programmed for. Moreover, non-zero values passed to HCPI 44 are proprietarily encrypted to prevent intentional or incidental access from third party (external) system applications.

The present invention also provides remote on/off switching of remote devices. FIG. 8 depicts a function called "user DSR as control output" 92. DSR (data set ready) is typically a hardware data flow control output function that indicates to the remote device that the HCPI is connected to the IP server and ready to accept data for transmission. In applications where the remote device does not require a DSR to be asserted for proper flow control this signal alternatively can be used for the on/off control of any co-located device.

Referring to FIG. 8, the field "Remote ID" 94 is shown. Since the present invention is capable of supporting a variety of remote devices, provision is made to control programming of HCPI 44 parameters on an individual, group or total basis, thereby making it possible and efficient to vary the communication of remote devices based on business rules, economics and user's needs. These attributes are consistent with and fully advance the cost-effectiveness of the present invention.

FIG. 8 also depicts a portion of menu 86 for initialization and configuration of IP server ports 96. SCPI 64 supports a multiplicity of IP server ports, each one able to provide service to a different remote monitoring host application computer program. This means that it is not necessary to purchase and operate multiple hardware computing platforms and conventional network connectivity in order to gain the advantages of the present invention for multiple applications, thus saving on system complexity and resources.

Figure 9:
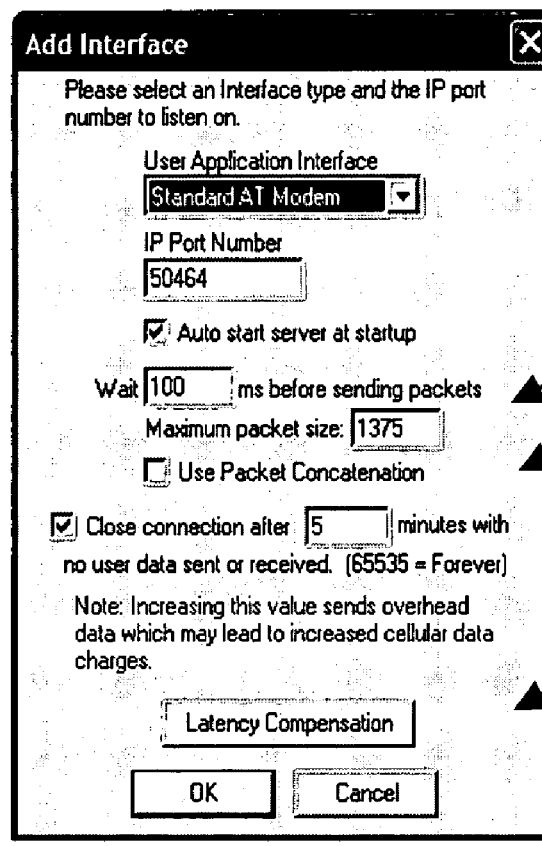
FIG. 9 is a screen display of the SCPI user interface for the IP server port configuration according to an embodiment of the present invention.

Referring now to FIG. 9, a screen shot of a menu 98 for adding interfaces is shown. User entry data fields "Maximum Packet Size" 100 and "Use Packet Concatenation" 102 are key variables for the PCT function of dynamic packet sizing and therefore directly bearing on the transparency goal. In practice, the remote system might routinely send packets that are larger than the maximum specified or could exceed the dynamic size established for a given communication session. In this case, packet concatenation can be activated to provide the receiving end with awareness of the need to combine received packets into one prior to forwarding on to the remote system. In the present invention, protocol Layer five (see FIG. 2) provides the packet concatenation support signaling.

Figure 10:
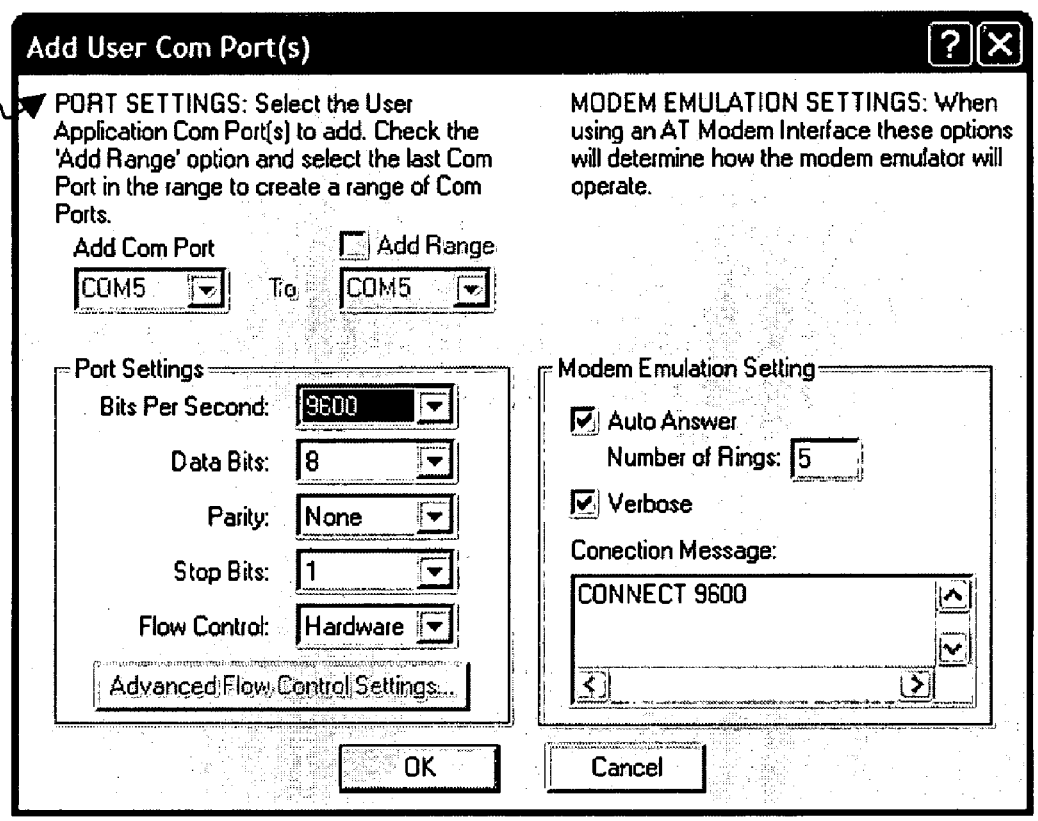
FIG. 10 is a screen display of the SCPI user interface for COM port configuration according to an embodiment of the present invention.

FIG. 10 is a screen shot that details a menu 104 for initialization and configuration of asynchronous serial data COM ports according to an embodiment of the present invention. With reference again to FIG. 4 and the example remote electric meter, logical communications ports 19 provide a direct interface to the user's host application computer program 16. The present invention can support a multiplicity of simultaneous COM port interfaces to a singular or to a multiplicity of host computer program applications all running on the same hardware platform.

Referring again to FIG. 9, a software switch labeled "Latency Compensation" 106 is shown. In an embodiment of the present invention, it is via switch 106 that the user of SCPI 64 gains access to the programmable PCT functions. One feature of the present invention is to provide for distinct PCT function access and configuration for each IP Server which has been configured. The present invention facilitates the user option of running a multiplicity of host computer program applications on a single hardware platform.

Figure 11:
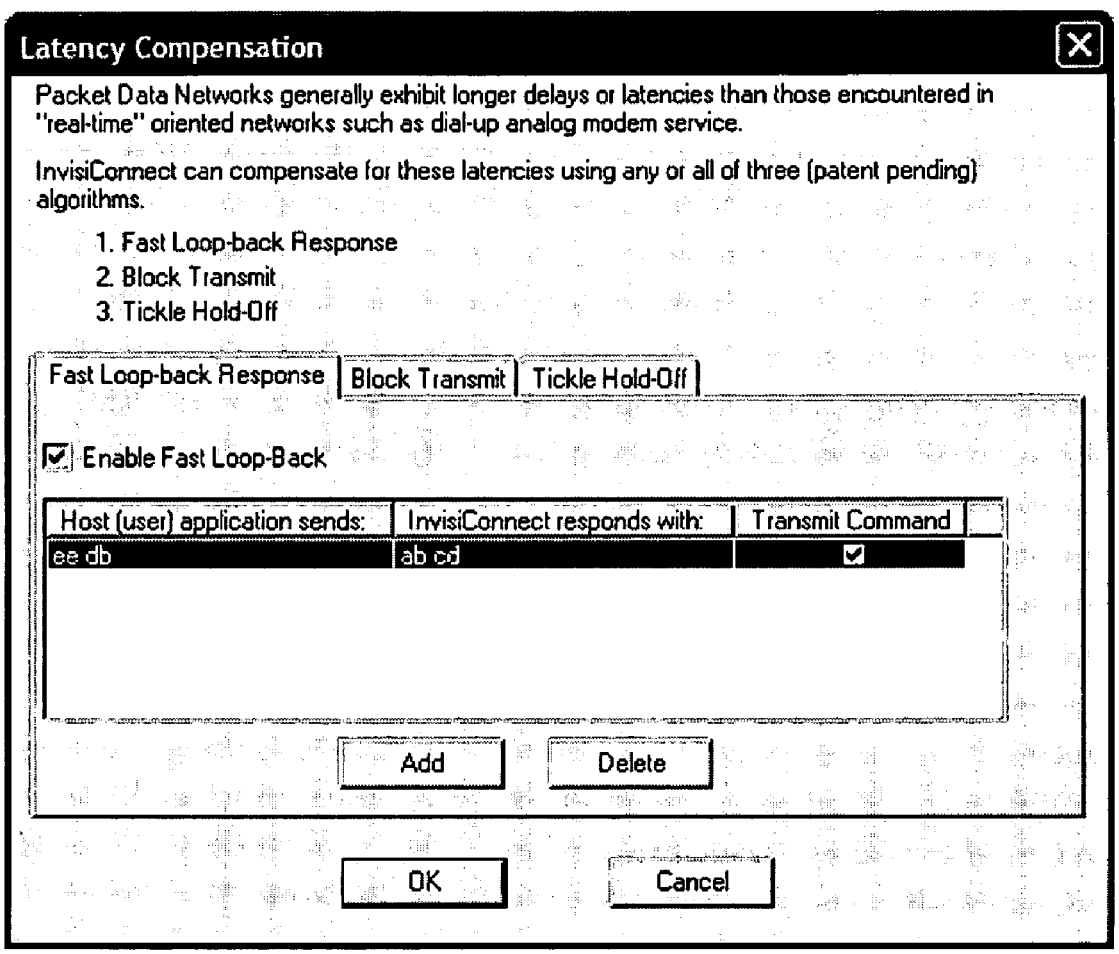
FIG. 11 is a screen display of the SCPI user interface for Fast Loop Back Programmable Connection Tuning (PCT) according to an embodiment of the present invention.
Figure 12:
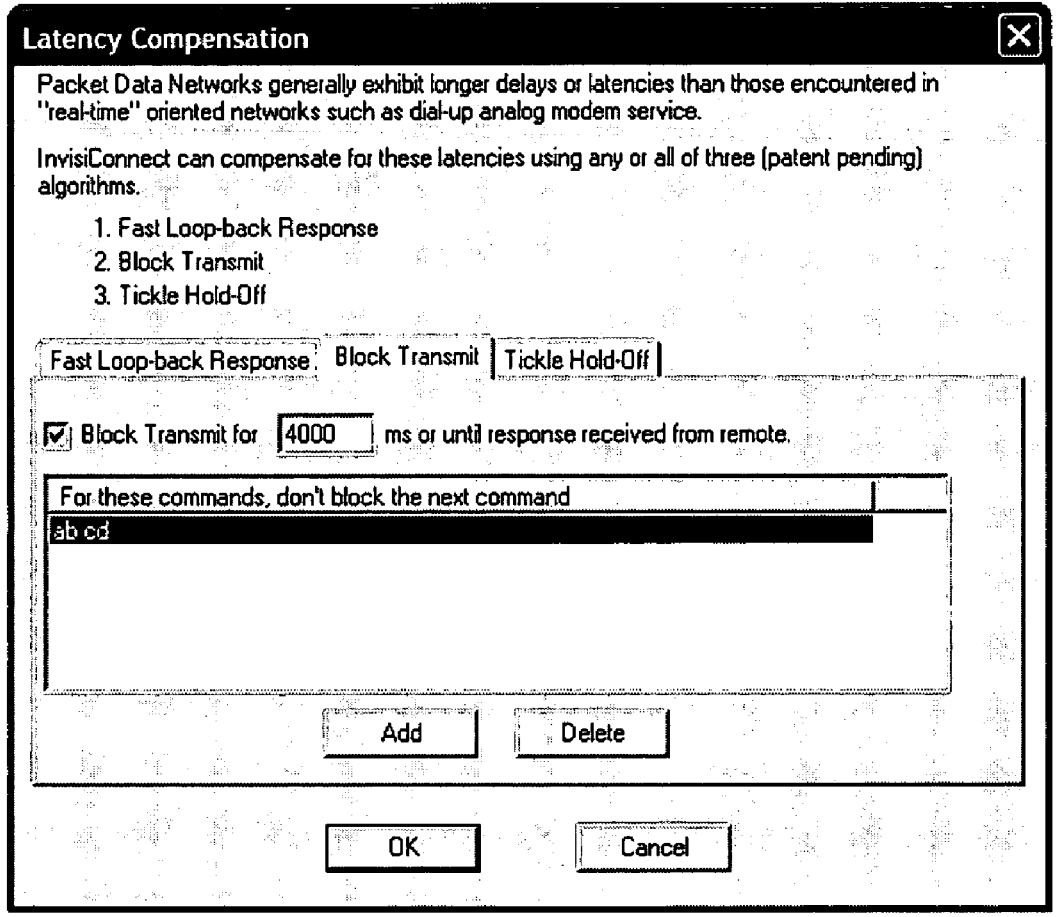
FIG. 12 is a screen display of the SCPI user interface for the Block Transmit Programmable Connection Tuning according to an embodiment of the present invention.
Figure 13:
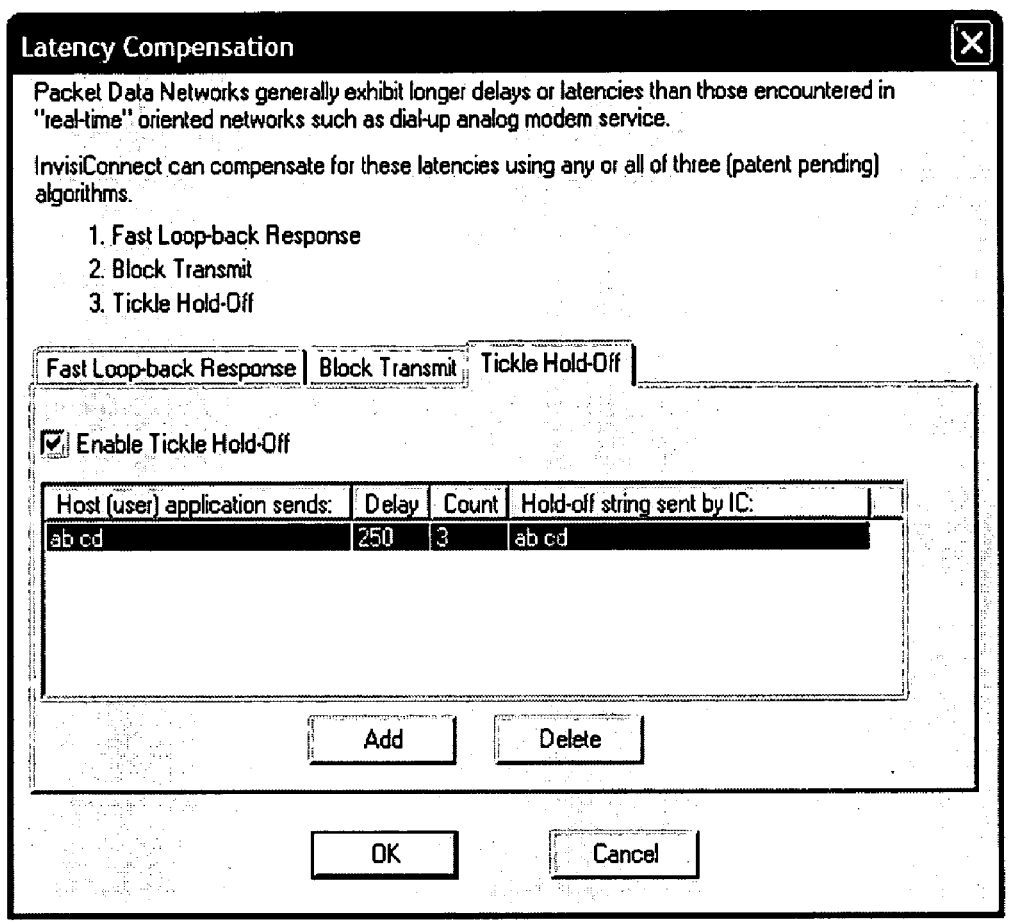
FIG. 13 is a screen display of the SCPI user interface for the Tickle Hold-Off Programmable Connection Tuning according to an embodiment of the present invention.

Referring now to FIGS. 11-13, submenus for configuration of the PCT functions referred to as "Fast Loop Back Response" 108, "Block Transmit" 110, and "Tickle Hold-Off" 112 respectively, are shown. These PCT functions are provided to make the interface between the RMC and the packet-switching network as transparent as practical.

In operation, Fast Loop-Back 108, as shown in FIG. 11, can be implemented by the SCPI when non-critical responses must be issued to the remote monitoring host application computer program in a time frame that cannot be achieved by waiting for the remote device to respond via the packet switched network. FIG. 11 depicts an example wherein the user, via trace monitoring of packets sent by the host application computer program and those received from the remote device, has determined that host application command "ee" "db" requires an immediate response of "ab" "cd" in order to continue the communication session. The SCPI is therefore programmed to scan data packets coming from the host application computer program and "loop back" a user defined response to the host application in order to satisfy the timing requirement. In an embodiment of the present invention the SCPI can, at the option of the user, forward the host application command to the remote device in addition to looping it back to the host application computer program. A multiplicity of such scenarios, limited only by the availability of computer memory, can be programmed into SCPI 64 for execution.

Block Transmit 110, shown in FIG. 12, can be implemented by SCPI 64 to obviate the impatience of the host application by impeding repeated commands for a programmable period, thereby enforcing the proper flow control of the command and response protocol which is native to the legacy remote monitoring system. Here again, this PCT function facilitates the transparency goal of the present invention. In an embodiment according to the present invention, block transmit algorithm 110 is, on a programmable basis, dependent upon the dynamic packet sizing algorithm and vice versa. This dependency allows for packet downsizing and subsequent concatenation in the forward transmission path. A multiplicity of such scenarios, limited only by the availability of computer memory, can be programmed into SCPI 64 for execution.

Tickle Hold-Off 112, shown in FIG. 13, can be implemented by SCPI 64 to satisfy the response needs of the host application computer program during the period it waits for the desired response from the remote device. As in the case for Fast Loop-Back 108, trace monitoring of packets might indicate that the host application computer program timing requirements are such that any response to its commands will keep the current communication session alive, thereby providing time for the remote device to issue the response that will cause the host application to proceed to the next sequential command normally sent during the session. In this case, Tickle Hold-Off 112 can be programmed to issue a user defined response to the host application at a programmable rate and to issue this response a programmable number of times. A multiplicity of such scenarios, limited only by the availability of computer memory, can be programmed into SCPI 64 for execution.

In the foregoing discussion packet-switched network 48 is described as a wireless network. One skilled in the art will recognize that in alternate embodiments of the present invention network 48 may be any conventional type of network comprising, without limitation, wired, satellite-based, electrical, radio frequency and optical transmission mediums.

While this invention has been shown and described with respect to a detailed embodiment thereof, it will be understood by those skilled in the art that various changes in form and detail thereof may be made without departing from the scope of the claims of the invention.

The invention claimed is:

1. An apparatus for facilitating communications between a control station and a remote device over a packet-switching network, comprising:
   a) a software component having a set of instructions stored on a computer-readable medium and executable by a processor of the control station, the instructions comprising:
      i) instructions for communicating data from a host application computer program of the control station to the remote device, comprising:
         1) a first transmission portion configured to accept signals from the host application computer program in a non-packet-switched format,
         2) a second transmission portion configured to convert the host application computer program signals into packet-switched data for transmission to a hardware component by means of a packet-switching network, and
         3) a third transmission portion configured to generate commands to satisfy at least one host application computer program handshaking protocol; and
      ii) instructions for receiving data from a hardware component, comprising:
         1) a first receiving portion configured to accept packet-switched data from the packet-switching network,
         2) a second receiving portion configured to convert the packet-switched data into non-packet-switched signals having a format compatible with the host application computer program, and
         3) a third receiving portion configured to generate commands to satisfy at least one host application computer program handshaking protocol; and b) a hardware component proximate the remote device, comprising:
  i) a transceiver portion electrically coupled to the packet-switching network and configured to:
    1) accept packet-switched signal data from the software component, and
    2) send packet-switched data to the software component;
  ii) a remote processor coupled between the transceiver portion and the remote device, the remote processor being configured to:
    1) convert packet-switched data received from the transceiver to non-packet-switched signals having a format compatible with the remote device, and
    2) convert non-packet-switched signals from the remote device to packet-switched data; and
  iii) a bidirectional data interface electrically coupled to the remote device and the remote processor to communicate signals from the remote device to the remote processor and to communicate signals from the remote processor to the remote device,
  wherein the control station and the remote device are in communication with each other via the packet-switching network, the control station and remote device using non-packet-switched signals to effect the communication.

2. The apparatus according to claim 1 wherein the commands to satisfy at least one computer program handshaking protocol comprise programmable connection tuning commands comprising at least one of fast loop-back commands, tickle hold-off commands, block transmit commands, and dynamic packet sizing commands.

3. The apparatus according to claim 1, further comprising a graphical user interface for configuring the commands to satisfy at least one computer program handshaking protocol.

4. The apparatus according to claim 1, further comprising a client computer program stored on a computer readable medium for initiating communications between the control station and the remote device.

5. The apparatus according to claim 4 wherein the client computer program stored on a computer readable medium comprises at least one of an e-mail program and a paging program.

6. The apparatus according to claim 1 wherein the remote processor further comprises embedded instructions that are executable by the remote processor.

7. The apparatus according to claim 1 wherein communications between the control station and the remote device are accomplished by means of a secure communications path.

8. The apparatus according to claim 1 wherein at least one of the host application computer program signals, software component packet switching data, hardware component packet switching data and remote processor signals are at least one of encrypted and decrypted.

9. The apparatus according to claim 1 wherein the control station and remote device comprise a SCADA system.

10. The apparatus according to claim 1 wherein the processor is a computer.

11. The apparatus according to claim 1 wherein only the hardware component initiates communication between the remote device and the control station.

12. The apparatus according to claim 11 wherein the hardware component is adapted to initiate communication with the control station in accordance with at least one of an interval schedule, dialing commands and a triggering event.

13. The apparatus according to claim 1 wherein the remote processor comprises a microprocessor.

14. The apparatus according to claim 1, wherein the first transmission portion accepts control and data signals from the host application computer program in a non-packet-switched format.

15. A method for facilitating communications between a control station and a remote device over a packet-switching network, comprising the steps of:
  a) providing, at the control station, a software component having a set of instructions stored on a computer-readable medium and executable by a processor of the control station;
  b) providing, at the remote device, a hardware component in proximity to and in electrical communication with the remote device;
  c) facilitating, the sending of communications from the control station to the remote device by:
    i) accepting, at the software component, signals from a host application computer program, the signals having a non-packet-switched format,
    ii) converting, via the software component, the host application computer program signals into packet switched data and sending the packet-switched data to the hardware component by means of the packet-switching network,
    iii) generating handshaking commands to satisfy at least one host application computer program handshaking protocol, and
    iv) communicating the handshaking commands to the host application computer program;
  d) facilitating, the receipt of communications from the remote device at the control station by:
    i) accepting, at the software component, packet-switched data from the network,
    ii) converting the packet-switched data to non-packet-switched signals compatible with the host application computer program,
    iii) generating handshaking commands to satisfy at least one host application computer program handshaking protocol, and
    iv) communicating the handshaking commands to the host application computer program;
  e) facilitating the receipt of communications from the control station at the remote device by:
    i) accepting packet-switched signals from the network at the hardware component,
    ii) converting, via the hardware component, the packet-switched data to a non-packet-switched signals compatible with the remote device, and
    iii) communicating the non-packet-switched signals to the remote device;
  f) facilitating the sending of communications from the remote device to the control station by:
    i) accepting, at the hardware component, signals from the remote device, the signals having a non-packet-switched format compatible with of the remote device;
    ii) converting the signals to packet-switched data; and
    iii) communicating the packet-switched data to the software component by means of the packet-switching network,
  wherein the control station and the remote device are in communication with each other via the packet-switching network, the control station and remote device using non-packet-switched signals to effect the communication.

16. The method according to claim 15 wherein the commands to satisfy at least one computer program handshaking protocol comprise programmable connection tuning commands comprising at least one of fast loop-back commands, tickle hold-off commands, block transmit commands, and dynamic packet sizing commands.

17. The method according to claim 15, further comprising the step of using a graphical user interface to configure the commands to satisfy at least one computer program handshaking protocol.

18. The method according to claim 15, further comprising the step of using a client computer program stored on a computer readable medium to initiate communications between the control station and the remote device.

19. The method according to claim 18 wherein the client computer program stored on a computer readable medium comprises at least one of an e-mail program and a paging program.

20. The method according to claim 15 wherein the steps of converting packet-switched data to a predetermined signal format and converting the signals to packet switched data within the hardware interface component are accomplished using embedded instructions.

21. The method according to claim 15 wherein communications between the control station and the remote device are accomplished by means of a secure communications path.

22. The method according to claim 15, further comprising the steps of encrypting at least one of the host application computer program signals, software component packet switching data, hardware component packet switching data and remote processor signals prior to transmission, and then decrypting at least one of the host application computer program signals, software component packet switching data, hardware component packet switching data and remote processor signals after reception.

23. The method according to claim 15 wherein the control station and remote device comprise a SCADA system.

24. The method according to claim 15 wherein the steps of facilitating, at the control station, communications from the control station to the remote device and the steps of facilitating, at the control station, communications from the remote device to the control station, are performed by a computer.

25. The method according to claim 15 wherein only the remote device initiates communication between the remote device and the control station.

26. The method according to claim 25 wherein the remote device initiates communication with the control station in accordance with at least one of an interval schedule, dialing commands and a triggering event.

27. The method according to claim 15 wherein the steps of facilitating, at the remote device, the receipt of communications from the control station via the packet-switching network and the steps of facilitating communications from the remote device to the control station via the packet switching network are performed by a microprocessor of the hardware component.

28. The method according to claim 15 wherein the signals accepted from the host application computer program are control and data signals.

* * * * *

UNITED STATES PATENT AND TRADEMARK OFFICE
CERTIFICATE OF CORRECTION

PATENT NO. : 7,356,046 B2  Page 1 of 1
APPLICATION NO. : 10/774570
DATED : April 8, 2008
INVENTOR(S) : Joseph L. Harley, Jr.

It is certified that error appears in the above-identified patent and that said Letters Patent is hereby corrected as shown below:

Column 2, line 9, replace "modem" with --modern--

Column 15, line 5, delete "signal".

Column 16, line 49, "switched data to a non-packet-switched signals" should read --switched data to non-packet-switched signals--.

Column 16, line 57, "switched format compatible with of the remote" should read --switched format compatible with the remote--.

Signed and Sealed this

Fifth Day of August, 2008

JON W. DUDAS
*Director of the United States Patent and Trademark Office*